United States Patent
Iwasaki (10) Patent No.: US 7,167,261 B2
(45) Date of Patent: Jan. 23, 2007

(54) IMAGE FORMING APPARATUS WITH PREDETERMINED COPY QUALITY SET BY USER OR OPERATOR

(75) Inventor: Takao Iwasaki, Tama (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 804 days.

(21) Appl. No.: 10/029,300

(22) Filed: Dec. 28, 2001

(65) Prior Publication Data

US 2003/0123081 A1 Jul. 3, 2003

(51) Int. Cl.
*B41B 25/00* (2006.01)

(52) U.S. Cl. ............ 358/1.15; 358/1.13; 382/232

(58) Field of Classification Search .................. 358/426.07–426.16, 1.15, 1.13; 382/232
See application file for complete search history.

(56) References Cited

U.S. PATENT DOCUMENTS

| | | | | |
|---|---|---|---|---|
| 5,149,977 A | * | 9/1992 | Mita | 250/556 |
| 5,991,515 A | * | 11/1999 | Fall et al. | 358/1.15 |
| 6,369,873 B1 | * | 4/2002 | Levy et al. | 355/27 |
| 6,483,609 B1 | * | 11/2002 | Ueno et al. | 358/434 |
| 6,567,544 B1 | * | 5/2003 | Kanno et al. | 382/169 |
| 6,658,156 B1 | * | 12/2003 | Aritomi | 382/239 |
| 6,792,153 B1 | * | 9/2004 | Tsujii | 382/239 |
| 6,917,707 B1 | * | 7/2005 | Kubota | 382/176 |
| 2002/0041396 A1 | * | 4/2002 | Ugajin et al. | 358/1.17 |
| 2002/0057918 A1 | * | 5/2002 | Kojima et al. | 399/27 |

FOREIGN PATENT DOCUMENTS

JP  11-263519  9/1999

* cited by examiner

*Primary Examiner*—Mark Zimmerman
*Assistant Examiner*—Jacob P. Rohwer
(74) *Attorney, Agent, or Firm*—Foley & Lardner LLP (57) ABSTRACT

The present invention can reflect precisely a user's demand by outputting a warning so as to change setting of a compression method and a compression rate when sufficient image quality cannot be obtained with a currently set compression rate in color copying.

6 Claims, 5 Drawing Sheets

IMAGE FORMING APPARATUS WITH PREDETERMINED COPY QUALITY SET BY USER OR OPERATOR

BACKGROUND OF THE INVENTION

The present invention relates to an image forming apparatus such as a full color copying machine or a color printer.

A so-called 4-series-tandem type full color copying machine has been conventionally known as an image forming apparatus which outputs a color image. In a four-tandem full color copying machine, four image forming units which respectively form yellow (Y), magenta (M), cyan (C) and black (BK) toner images on the basis of a color-separated image signal are disposed along a conveying belt.

Each color image forming unit includes a photo-sensitive drum which rotatably contacts a conveying belt, a charging device which charges a drum surface to a predetermined potential, an exposure device which exposes the drum surface with light to form an electrostatic latent image, a development device which supplies toner to the electrostatic latent image on the drum surface to develop the electrostatic latent image, and a transfer device which transfers the developed toner image to a recording sheet which is being adsorbed and conveyed on the conveying belt. In this way, the recording sheet adsorbed on the conveying belt is conveyed through four image forming units (process units). Color toner images are transferred to the recording sheet in a superposed manner, and the recording sheet is fed to a fixing device. At the fixing device, the color toner images are fixed onto the recording sheet so as to form a color image.

The above-described four-tandem color copying machine is configured by a scanner section, an image processing section, an image compression section, an image register section (HDD), an image expansion section and a printer section.

Recently, in accordance with an increase in the capacity of the image register section (HDD), at the time of performing color copy, a scanned image is compressed and then stored in an HDD or the like. The compressed image is read out and re-formed. Then, the re-formed image is printed.

If the compression is performed with a low compression rate (high image quality), the amount of compressable image data is increased. As the result, the copy speed becomes low. If the compression is performed with a high compression rate, the image quality is deteriorated, but the copy speed is increased.

When a user designates the compression rate (in operation, the user designates "high image quality", "normal" or the like) and then scanning is performed, a sufficient image quality may be maintained by the compression rate or may not be maintained by the compression rate. In order to solve the problem, a pre-scanning is performed so as to automatically set an optimized compression rate. However, there may be a case in which a user does not need a high image quality (low compression rate). Therefore, a user's demand cannot be reflected precisely.

BRIEF SUMMARY OF THE INVENTION

An object of the present invention to reflect precisely a user's demand by outputting a warning so as to change setting of a compression rate when sufficient image quality cannot be obtained with the currently set compression rate in color copying.

In order to accomplish the object, the present invention provides an image forming apparatus which comprises: a scanner section which reads an original image to output image data of various colors; a setting section which sets a compression rate of the image data outputted from the scanner section; a compression section which compresses the image data outputted from the scanner section at the compression rate set by the setting section; a register section which registers the image data outputted from the compression section and the compression rate; an expansion section which expands the image data registered in the register section on the basis of the compression rate corresponding to the image data; an image forming section which performs image formation with respect to the image data expanded in the expansion section on an image-formed medium; reading means for reading in advance the original image by the scanner section; a determination section which determines whether or not a predetermined image quality can be obtained at the time of forming an image on the image-formed medium in the image forming section by a state of the original image read by the reading means and the compression rate set by the setting section; and an inform section which informs an operator that the predetermined image quality cannot be obtained when the determination section determines that the predetermined image quality cannot be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, an image forming apparatus according to an embodiment of the present invention will be described with reference to the drawings.

Figure 1:
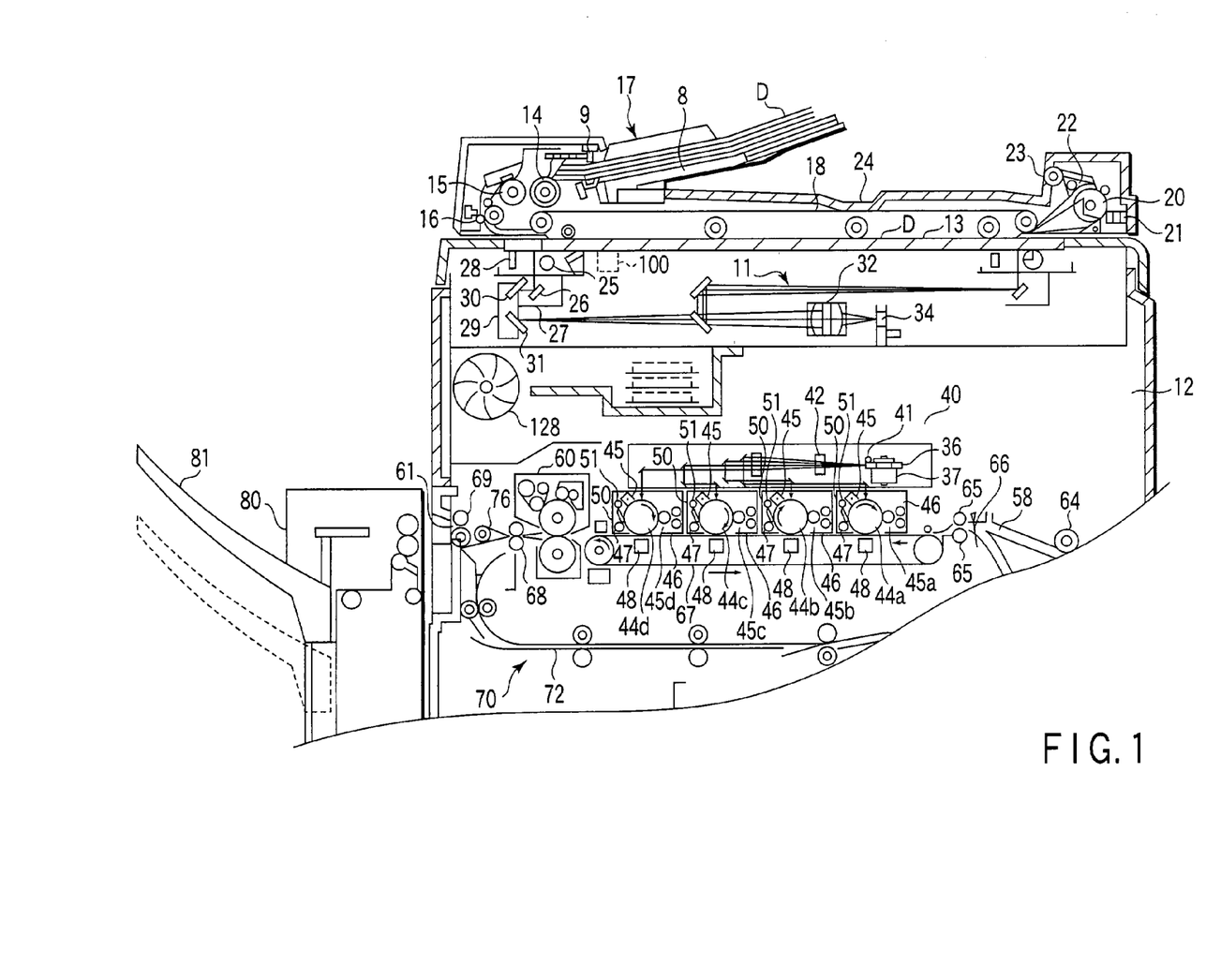
FIGS. 1 and 2 are cross-sectional views showing a schematic structure of an image forming apparatus.
Figure 2:
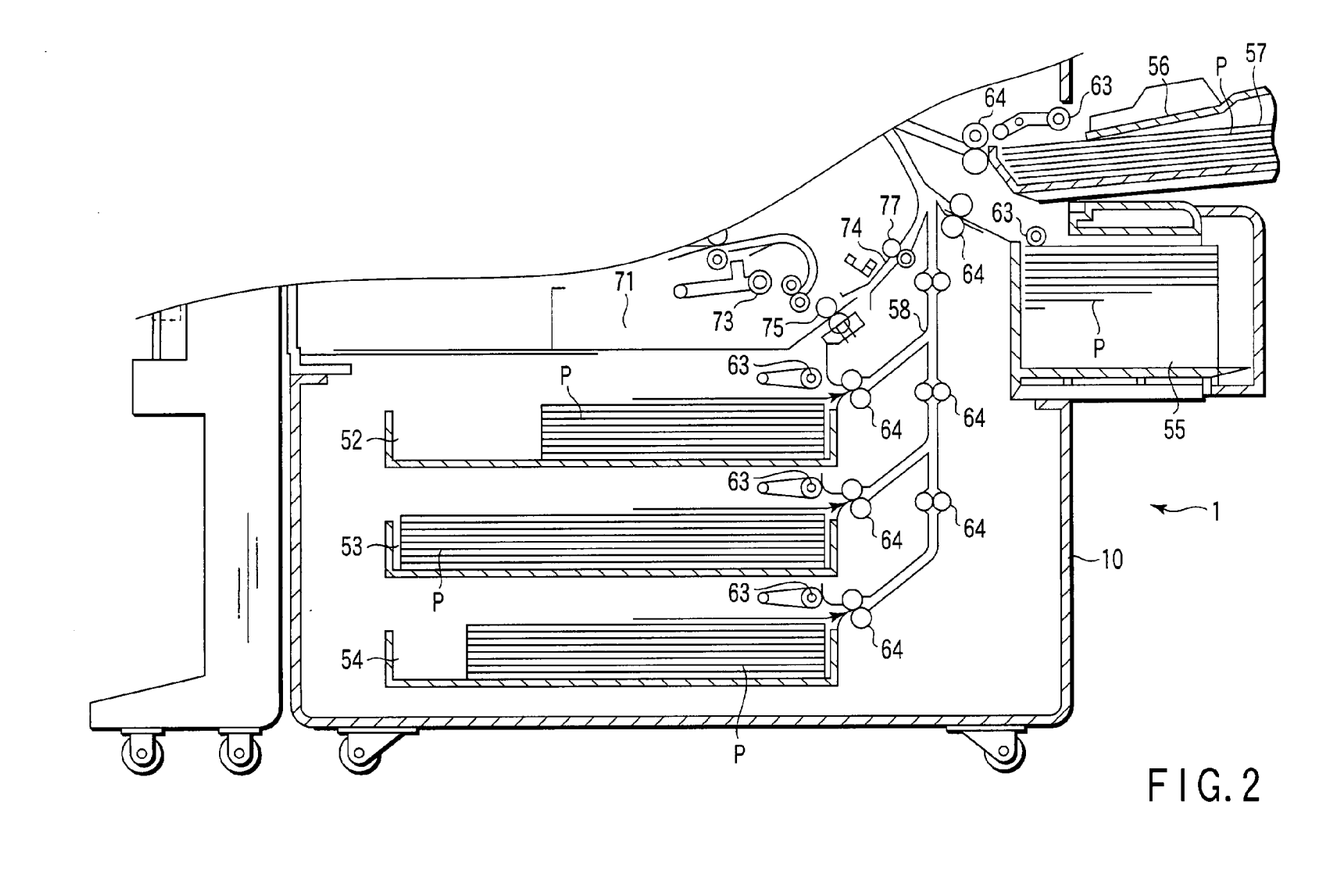

FIGS. 1 and 2 are cross-sectional views showing a schematic structure of a color digital copying machine 1 which is an example of the image forming apparatus of the present invention.

As shown in FIGS. 1 and 2, the digital copying machine 1 comprises a main body 10. A scanner section 11 serving as reading means and a color printer section 12 which functions as image forming means are provided within the main body 10.

An automatic document feeder (hereinafter referred to as ADF) 17 which serves as a document cover and automatically feeds sheet-like documents one-by-one is provided at an upper portion of the main body 10 so as to be opened and closed. In place of the ADF 17, a platen may be mounted to the upper portion of the main body 10 as the document cover. An operation panel (not shown) including various types of operation keys for instructing copy conditions or start of copying, various displays and the like is provided at an upper front portion of the main body 10.

A detector 100 which detects opening or closing of the ADF 17 is provided at the main body 10 in the vicinity of a portion to which the ADF 17 is mounted. The detector 100 detects opening or closing of the platen when the platen is mounted instead of the ADF 17.

A sheet feeding cassette 57 which can store a small number of sheets, and a large capacity sheet feeding cassette 55 which can store a large number of sheets are detachably provided at a right side portion of the main body 10. The sheet feeding cassette 57 has a manual feeding tray 56 for manually supplying sheets.

Sheet feeding cassettes 52, 53 and 54 are detachably provided at a lower portion of the main body 10. Each sheet feeding cassette stores sheets having the different size in longitudinal and lateral directions. Any of the cassette is selected as the occasion demands. A finisher 80 for receiving copied sheets is provided at a left side portion of the main body 10.

An original document mount 13 formed of a transparent glass on which an object to be read, i.e., an original document D is mounted and the ADF 17 for automatically feeding the original document on the document table 13 are disposed on an upper surface of the main body 10. The ADF 17 is provided so as to open or close relative to the document table 13, and also functions as an original cover for fitting the original document D placed on the original document mount 13 and the original document mount 13 close together.

The ADF 17 comprises: an original document tray 8 on which the original document D is set; an empty sensor 9 for detecting the presence or absence of the original document, a pick-up roller 14 for picking up the original document D one by one from the original document tray 8; a sheet feeding roller 15 for conveying the picked up original document D; a pair of aligning rollers 16 for aligning a distal edge of the original document D; an aligning sensor (not shown) provided on an upstream side of the pair of aligning rollers 16 for detecting reach of the original document D; a size sensor (not shown) for detecting the size of the original document D; and a conveying belt 18 disposed so as to cover substantially the entire original document mount 13. A plurality of original documents set on the original document tray 8 so as to face upward are successively picked up from a bottom page, i.e., a last page and aligned by the pair of aligning rollers 16. Then, the documents are conveyed by the conveying belt 18 to a predetermined position on the original document mount 13.

In the ADF 17, an inversion roller 20, a non-inversion sensor 21, a flapper 22 and a discharge roller 23 are disposed at an end portion on the opposite side of the conveying belt 18 with respect to the pair of aligning rollers 16. The original document D whose image information has been read by the scanner section 11 is fed from the original document mount 13 by the conveying belt 18. Then, the original document D passes through the inversion roller 20, the flapper 22 and the discharge roller 23 and is discharged onto an original document discharge portion 24 at the upper surface of the ADF 17.

When a back surface of the original document D is read, the original document D conveyed by the conveying belt 18 is inverted with the inversion roller 20 by switching the flapper 22. Then, the inverted original document D is fed by the conveying belt 18 to a predetermined position on the original document mount 13.

The ADF 17 has a sheet feeding motor for driving the pick-up roller 14, the sheet feeding roller 15 and the pair of aligning rollers 16 and a conveyance motor for driving the conveying belt 18, the inversion roller 20 and the discharge roller 23.

The scanner section 11 disposed within the main body 10 has a light source 25 such as a fluorescent lamp for illuminating the original document D disposed on the original document mount 13 and a first mirror 26 which deflects light reflected from the original document D in a predetermined direction. The light source 25 and the first mirror 26 are mounted to a first carriage 27 disposed below the original document mount 13. A size sensor 28 which detects the size of the original document disposed on the original document mount 13 is mounted above the first carriage 27. The first carriage 27 is disposed so as to be movable parallel to the original document mount 13. The first carriage 27 is reciprocally moved below the original document mount 13 by the driving motor via an unillustrated toothed belt or the like.

A second carriage 29 which can move in parallel to the original document mount 13 is disposed below the original document mount 13. A second mirror 30 and a third mirror 31 for successively deflecting the reflected light from the original document D, deflected by the first mirror 26 are mounted to the second carriage 29 so as to make a right angle. The second carriage 29 is moved in accordance with the first carriage 27 by the toothed belt which drives the first carriage 27 and is moved in parallel along the original document mount 13 at half the speed of the first carriage.

An imaging lens 32 which converges the reflected light from the third mirror 31 disposed on the second carriage 29 and a CCD sensor 34 which receives the reflected light converged by the imaging lens and photoelectrically converts the light are disposed below the original document mount 13. The imaging lens 32 is disposed within a plane including an optical axis of the light deflected by the third mirror 31 so as to be movable via a driving mechanism. The imaging lens 32 images the reflected light at a desired magnification by being moved. The CCD sensor 34 photoelectrically converts the reflected light entered therein and outputs an electric signal corresponding to the read original document D.

The color printer section 12 comprises a laser exposure device 40 serving as exposure means. The laser exposure device 40 comprises a semiconductor laser 41 serving as a light source, a polygon mirror 36 serving as a scanning member for successively deflecting laser light emitted from the semiconductor laser 41, a polygon motor 37 serving as a scanning motor for rotatably driving the polygon mirror 36 at a predetermined speed to be described later, and an optical system 42 for deflecting the laser light from the polygon mirror 36 and directing the light to photosensitive drums 44*a* to 44*d* to be described later. The laser exposure device 40 with the above-described structure is fixed to and supported by a supporting frame (not shown) of the main body 10.

The semiconductor laser 41 is on-off controlled depending on the image information of the original document D read by the scanner section 11. The laser light is directed via the polygon mirror 36 and the optical system 42 to the photosensitive drums 44*a* to 44*d*. Then, circumferential surfaces of the photosensitive drums 44*a* to 44*d* are scanned with the light to form electrostatic latent images on the circumferential surfaces of the photosensitive drums 44a to 44d.

The image forming section 12 has the rotatable photosensitive drums 44a to 44d serving as image holding members disposed at a substantial center of the main body 10. A desired electrostatic latent image exposed by the laser light from the laser exposure device 40 is formed on the circumference surface of each of the photosensitive drums 44a to 44d.

Successively disposed around each of the photosensitive drums 44a to 44d are a charger 45 for charging the circumferential surface of each of the photosensitive drums 44a to 44d to a predetermined electric charge, a development device 46 for supplying toner serving as a developer to the circumferential surface of each of the photosensitive drums 44a to 44d to develop the latent image at a desired image density, a peeling charger 47 for separating a transferred member (recording medium) fed from each of the sheet feeding cassettes 52, 53, 54, 55 and 57, i.e., a copy sheet P from each of the photosensitive drums 44a to 44d, a transfer charger 48 for transferring a toner image formed on each of the photosensitive drums 44a to 44d to the sheet P, a peeling pawl (not shown) for peeling the copy sheet P from the circumferential surface of each of the photosensitive drums 44a to 44d, a cleaning device 50 for cleaning the toner remaining on the circumferential surface of each of the photosensitive drums 44a to 44d and a static electricity remover 51 for removing static electricity on the circumferential surface of each of the photosensitive drums 44a to 44d.

An image forming unit 45a (45b, 45c or 45d) is formed of the photosensitive drum 44a (44b, 44c or 44d) and various devices disposed around the photosensitive drum 44a (44b, 44c or 44d).

In this embodiment of the present invention, a Y image, an M image, a C image and a BK image are superposed from the upstream side in a direction in which an arbitrary point on the conveying belt 67 is moved, i.e., a direction in which the copy sheet P is conveyed. Thus, the respective image forming units 45a to 45d are disposed in the order of Y, M, C and BK.

The sheet feeding cassettes 52, 53 and 54 which can be drawn from the main body 10 are disposed in a superposed manner at a lower portion within the main body 10. Copy sheets with different sizes are loaded within the cassettes 52, 53 and 54. The large capacity sheet feeding cassette 55 is provided at the side of the cassettes 52, 53 and 54. About 3000 copy sheets of a frequently-used size, e.g., A4 size are stored in the large capacity sheet feeding cassette 55. The sheet feeding cassette 57 which also serves as the manual feeding tray 56 is detachably mounted above the large capacity sheet feeding cassette 55.

A conveyance path 58 which extends from the cassettes through transfer sections, each of which is disposed between each of the photosensitive drums 44a to 44d and the transfer charger 48, is formed within the main body 10. A fixing device 60 is disposed at an end of the conveyance path 58. A discharge opening 61 is formed at a side wall of the main body 10 so as to oppose the fixing device 60. The finisher 80 is attached to the discharge opening 61.

A pick-up roller 63 for picking up sheets one by one from the cassettes is provided in the vicinity of each of the sheet feeding cassettes 52, 53, 54, 55 and 57. A large number of pairs of sheet feeding rollers 64 for conveying a copy sheet P picked up by the pick-up roller 63 through the conveyance path 58 are provided at the conveyance path 58.

A pair of registration rollers 65 is disposed on the upstream side of the photosensitive drums 44a to 44d in the conveyance path 58. The pair of registration rollers 65 corrects a tilt of the picked up copy sheet P and conforms a distal end of a toner image on each of the photosensitive drums 44a to 44d to a distal end of the copy sheet P. Then, the pair of registration rollers 65 feeds the copy sheet P to the transfer section at the same speed as the speed at which the circumference surfaces of the photosensitive drums 44a to 44d move. An aligning sensor 66 for detecting reach of the copy sheet P is provided in front of the pair of registration rollers 65, i.e., at the side of the sheet feeding roller 64.

The copy sheet P picked up one by one from the cassettes by the pick-up roller 63 is fed to the pair of registration rollers 65 by a pair of sheet feeding rollers 64. Then, the distal end of the copy sheet P is aligned by the pair of registration rollers 65. Subsequently, the copy sheet P is fed to the transfer section by the conveying belt (transfer belt) 67.

In the transfer section, developer images formed on the photosensitive drums 44a to 44d, i.e., toner images are transferred to the copy sheet P by the transfer charger 48. The copy sheet P with the toner images transferred thereto is peeled from the circumferential surface of each of the photosensitive drums 44a to 44d by the peeling charger 47 and the peeling pawl (not shown). Then, the copy sheet P is conveyed via the conveying belt 67 configuring a part of the conveyance path 58 to the fixing device 60. The developer images are fused and fixed to the copy sheet P by the fixing device 60. Thereafter, the copy sheet P is discharging via the discharge opening 61 to the discharge tray 81 of the finisher 80 by a pair of sheet feeding rollers 68 and a pair of discharge rollers 69.

An automatic duplex device (ADD) 70 which inverts the copy sheet P which has passed through the fixing device 60 and feeds again the sheet to a pair of registration rollers 65 is provided below the conveyance path 58. The automatic duplex device 70 includes a temporary storage portion 71 for temporarily storing copy sheets P, an inversion path 72 which branches off from the conveyance path 58 and inverts the copy sheet P passing through the fixing device 60 to guide to the temporary storage portion 71, a pick-up roller 73 for picking up the copy sheets P stored in the temporary storage portion one by one, and a sheet feeding roller 75 for feeding the picked up sheet through the conveyance path 74 to the pair of registration rollers 65. A portion where the inversion path 72 branches off from the conveyance path 58 is provided with a sorting gate 76 for selectively sorting the copy sheet P to either the discharge opening 61 or the inversion path 72.

In a case of duplex copying, the copy sheet P which has passed through the fixing device 60 is guided by the sorting gate 76 to the inversion path 72, inverted and temporarily stored in the temporary storage portion 71. Then, the copy sheet P is fed by the pick-up roller 73 and a pair of sheet feeding rollers 75 to the pair of registration rollers 65 through the conveyance path 74. The copy sheet P is aligned by the pair of registration rollers 65 and fed again to the transfer section. At the transfer section, toner images are transferred to a back surface of the copy sheet P. Thereafter, the copy sheet P is discharged via the conveyance path 58, the fixing device 60 and the discharge roller 69 to the discharge tray 81 of the finisher 80.

The copy sheet can be discharged by the automatic duplex device 70 with its printed surface facing downward. That is, firstly, an image is transferred to the surface of the sheet and fixed thereto. Then, the sheet is temporarily stored in the temporary storage portion 71. The sheet is conveyed by pick-up roller 73 and the pair of sheet feeding rollers 75 and the pair of rollers 77 and passed through the conveyance path 74. Thereafter, the sheet is aligned by the pair of registration rollers 65. The sheet is passed through the conveyance path 58, the fixing device 60 and the discharge roller 69, and is discharged to the discharge tray 81 of the finisher 80.

An operational panel (which will be described later) 91 for instructing various copy conditions including a copy magnification and the like and a start of copying (start key) is provided at an upper front portion of the main body 10.

Figure 3:
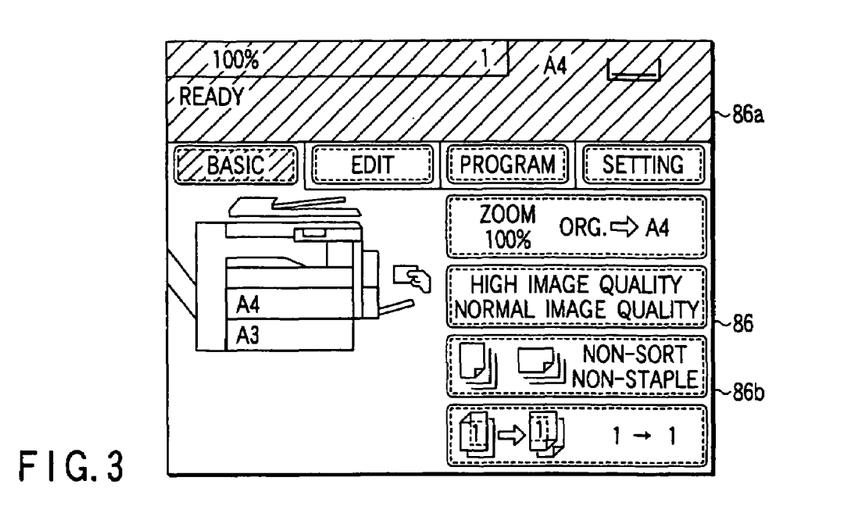
FIG. 3 is a diagram showing a display example of a liquid crystal display portion.

As shown in FIG. 3, the operational panel 91 is provided with a touch key-built liquid crystal display portion (LCD) 86 which performs operational guidance and various instructions.

As shown in FIG. 3, the liquid crystal display portion 86 is configured by an operation guidance display portion 86a on which an operational guide such as "READY" is displayed and a setting display portion 86b on which the contents of various settings are switched and displayed. As shown in FIG. 3, at the setting display portion 86b, an initial screen is a screen for setting basic functions (BASIC) and a selected state in LCF52 is displayed. A setting state in which a zoom magnification is 100%, a size of an original document is A4, "HIGH IMAGE QUALITY", "NORMAL IMAGE QUALITY", non-sort and non-staple are selected, a ratio of original document to copy sheet of 1:1 is displayed. Icons for instructing edit, program, setting changes and the like are displayed.

The setting display portion 86b includes setting screens EDIT, PROGRAM and SETTINGS. For example, with the setting screen PROGRAM or SETTINGS, setting of priority, canceling of job, display of job list, changing or adding setting of priority can be performed.

The above-described digital copying machine 1 may be used alone or may be used as a network printer.

In a case of using the digital copying machine 1 as a network printer, the digital copying machine 1 is configured to be connected via a local network (LAN) (not shown) to personal computers (PCs) (not shown) and a server (not shown).

Figure 4:
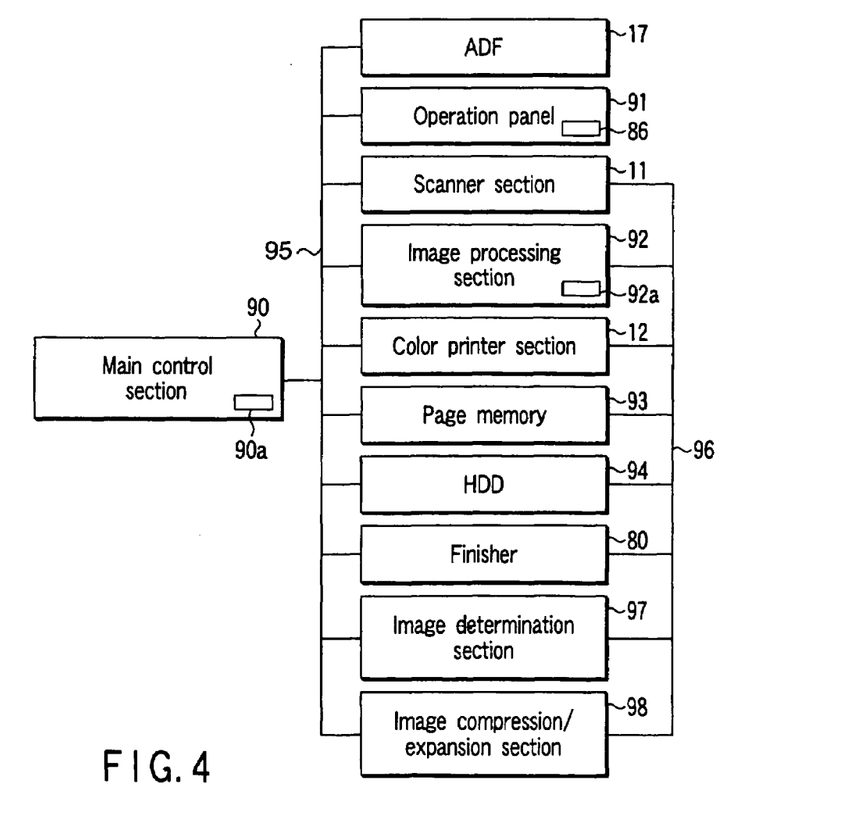
FIG. 4 is a block diagram showing the schematic structure of the image forming apparatus.

An internal structure of a control circuit of the above-described digital copying machine 1 will be described with reference to FIG. 4.

The digital copying machine 1 is provided with a main control section 90 which controls the whole machine 1. The main control section 90 is configured by a CPU (central processing unit) (not shown) for governing control of its operation, a ROM (read only memory) (not shown) in which a software for operating the digital copying machine 1 is stored and a RAM (random access memory) (S-RAM) 90a in which image data and operational data are temporarily stored.

The main control section 90 is connected via a bus 95 to the ADF 17, the scanner section 11, the color printer section 12, the finisher 80, the operational panel 91, an image processing section 92, a page memory 93, an HDD 94, an image determination section 97 and an image compression/expansion section 98. The image processing section 92, the page memory 93, the HDD 94, the image determination section 97 and the image compression/expansion section 98 are connected together via an image bus 96.

The image processing section 92 processes original image data read by the scanner section 11 and image data from the page memory 93, the image compression/expansion section 98 and the HDD 94. Further, the image processing section 92 outputs the processed image data to the page memory 93, the image compression/expansion section 98, the printer section 12 or the HDD 94.

The image processing section 92 has a color conversion section 92a. The color conversion section 92a converts red, green and blue image data read by the scanner section 11 into yellow, magenta, cyan and black image data.

The image determination section 97 determines whether or not an original image is a highly detailed image by bitmap data of a sheet of original document (one of red, green and blue) expanded in the page memory 93 and the amount of the data. For example, a highly detailed image is a photographic image or a detailed design drawing. A non-detailed image is, e.g., an image formed of character strings. Whether or not the original is a highly detailed image may be determined by the total number of pixels having a predetermined density value or greater in each scanning line read by the scanner section 11.

The image compression/expansion section 98 compresses each color image data from the page memory 93 with a compression rate and a compression method (an encoding method) set by the main control section 90, and expands the image data from the HDD 94. For example, data lengths before and after compression referred to as flanmeo are formed by a first compression for performing compression of data having a fixed length and a second compression for performing a reversible encoding.

The HDD 94 is an external storage device such as a hard disk for storing various data.

If the main control section 90 determines that a start key is pressed, the main control section 90 drive-controls the scanner section 11 so as to perform pre-scanning.

The main control section 90 compresses the image determined by the image determination section 97 with a compression rate and a compression method corresponding to an image quality set in advance. At that time, the main control section 90 determines whether or not printing can be performed with a sufficient image quality.

The main control section 90 has an input task and a print task, both of which are managed for each job.

Figure 5A:
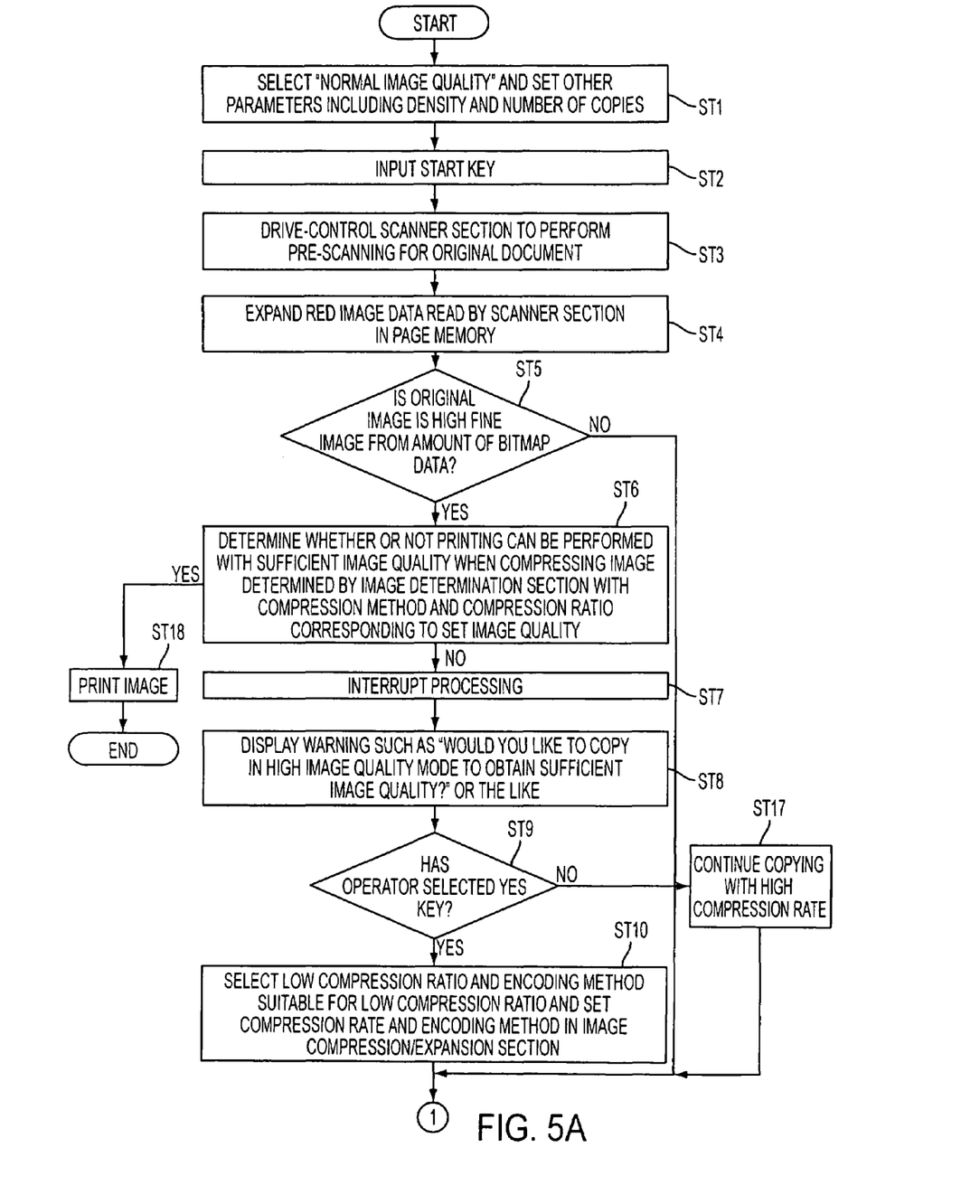
FIGS. 5A and 5B show a flow chart for explaining a print processing.
Figure 5B:
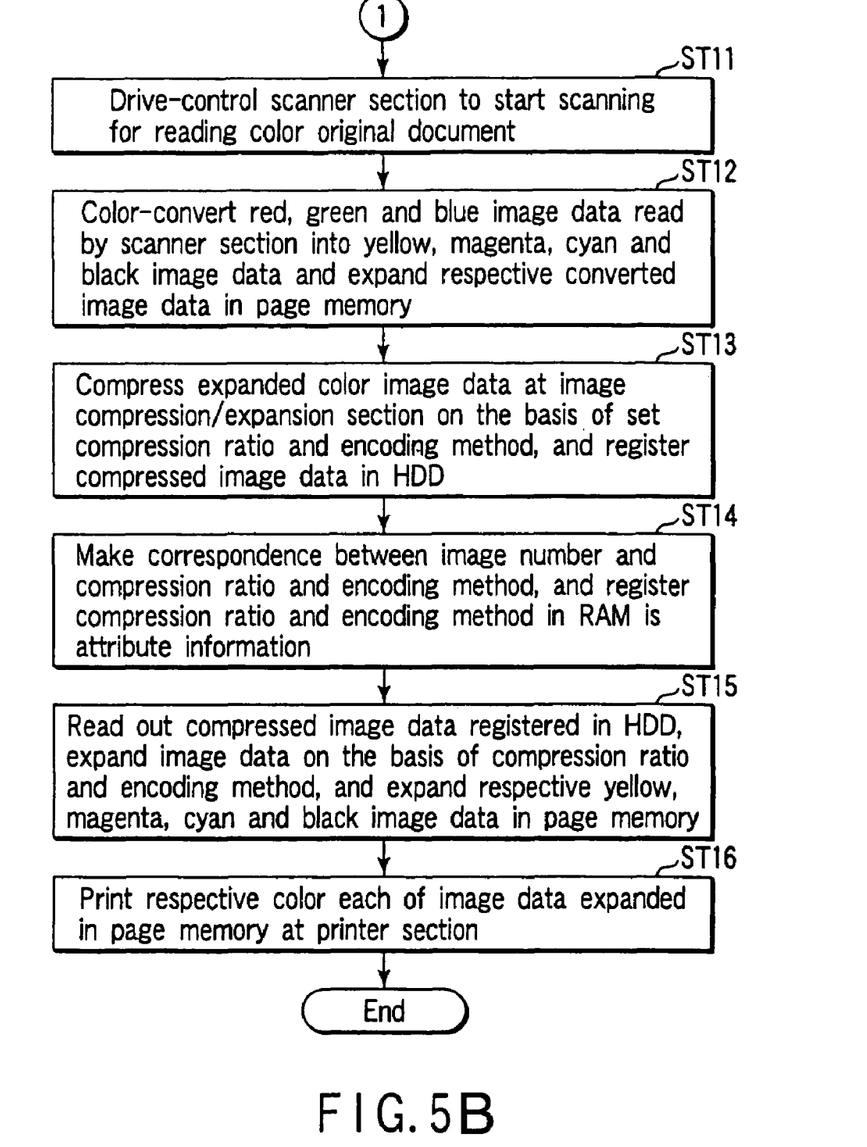

Next, a description will be given of a print processing for color original document D in the above-described configuration with reference to a flowchart shown in FIGS. 5A and 5B.

First, an operator selects "ORIGINAL IMAGE QUALITY" on a setting display portion 86b of the operational panel 91 and sets parameters including density and number of copies and the like (ST1). Then, an operator presses the start key (ST2).

The main control section 90 drive-controls the scanner section 11 and performs a pre-scanning for an original document D disposed on the original document mount 13 (ST3). Thus, red image data read by the scanner section 11 is expanded in the page memory 93 (ST4). The image determination section 97 determines whether or not the original image is a highly detailed image by bitmap data of a sheet of original (red) expanded in the page memory 93 and the amount of the data. The result of determination is outputted to the main control section 90 (ST5). The main control section 90 determines whether or not printing can be performed with a sufficient image quality when compressing the image determined in the image determination section 97 with a compression rate and a compression method corresponding to the set image quality (ST6).

As a result of the determination, when the main control section 90 determines that printing can be performed with a sufficient image quality, the image is printed in a normal manner (ST18). If the determination by the main control section 90 is that the printing cannot be performed with a sufficient image quality, a processing is interrupted (ST7). Then, a warning message such as "Would you like to copy in a high image quality mode to obtain a sufficient image quality?" is displayed on the operational guide display portion 86a of the operational path 91 (ST8).

Then, when an operator selects the YES key (ST9), the main control section 90 selects a low compression rate and an encoding method suitable for the low compression rate, and sets the compression rate and the encoding method in the image compression/expansion section 98 (ST10).

The main control section 90 drive-controls the scanner section 11 to start scanning for reading a color original document (ST1). Red, green and blue image data read by the scanner section 11 are color-converted into yellow, magenta, cyan and black image data by the color conversion section 92a of the image processing section 92. Thereafter, the converted image data is respectively expanded in the page memory 93 (ST12). Each color image data expanded in the page memory 93 is compressed by the image compression/expansion section 98 on the basis of the set compression rate and the encoding method, and the compressed data is registered in the HDD 94 (ST13). At that time, the main control section 90 makes correspondence between an image number and the compression rate and the encoding method, and registers the compression rate and the encoding method in the RAM 90a as attribute information (ST14).

The compressed image data registered in the HDD 94 is read out by control of the main control section 90. The image data is expanded by the image compression/expansion section 98 on the basis of the compression rate and the encoding method. As a result, each of yellow, magenta, cyan and black image data is expanded in the page memory 93 (ST15). Each piece of color image data expanded in the page memory 93 is outputted to the printer section 12 and printed at the printer section 12 (ST16).

If an operator selects the NO key on the display in step 8 (ST9), the main control section 90 determines that copying with a high compression rate continues (ST17). Then, the process proceeds to step 11.

If the main control section 90 determines that printing can be performed with sufficient image quality in the above step 6, the process proceeds to step 11.

The same processing is performed for the original documents D successively disposed on the original document mount 13 by the ADF 17. When a plural number of copies are designated, print processing is performed for the second and subsequent copies by reading out the image data from the HDD 94.

Then, the compression method is changed in accordance with the instruction and scanning is performed again, so that copying can be performed with a required image quality being maintained.

If copying is performed without changing the compression rate, the copy speed is fast but the image quality is decreased.

As described above, pre-scanning is performed at the time of copying and whether or not a sufficient image quality can be obtained with a compression rate set in advance by an operator is determined. Then, if necessary, a warning message is displayed in order for an operator to select continuing copying or copying with a decreased compression rate. Therefore, an image quality which satisfies the operator's needs can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
   reading means for reading image data of red, image data of green and image data of blue by scanning an original image from an original;
   first selecting means for selecting image forming with respect to an original of low image quality;
   expanding means for expanding the image data of at least one of red, green and blue of the original image read from the original in bitmap data of one page of the original through prescanning by the reading means;
   distinguishing means for distinguishing whether the original image is a highly detailed image or not by an amount of the bitmap data;
   determining means for determining whether or not an image of sufficient image quality can be formed when an image distinguished by the distinguishing means is compressed by a compression method and a compression rate corresponding to the image quality selected by the first selecting means;
   guiding means for, when the determining means determines that the image of sufficient image quality cannot be formed, interrupting forming of the image, guiding an operator and displaying a warning message;
   second selecting means for selecting whether or not the forming of the image with a high image quality is continued;
   first setting means for setting an encoding method suitable for a low compression rate when the forming of the image with the high image quality is selected by the second selecting means;
   second setting means for setting an encoding method suitable for a high compression rate, when the distinguishing means distinguishes that the original image is not a highly detailed image and when the second selecting means does not select the forming of the image with the high image quality;
   image processing means for reading the original image through re-scanning by the reading means and converting the image data of red, the image data of green and the image data of blue to image forming data for colors of yellow (Y), magenta (M), cyan (C) and black (BK);
   registering means for compressing image forming data for the colors supplied from the image processing means with the compression rate and the encoding method set by the first setting means or second setting means, and registering the image forming data as compressed image data in a storage portion; and
   image forming means for reading the compressed image forming data registered by the registering means in the storage portion and forming an image in an image-formed medium by the image forming data expanded based on the compression rate and the encoding method set by the first setting means or second setting means.

2. The apparatus according to claim 1, wherein the compressing and expanding are performed by a common circuit.

3. The apparatus according to claim 1, wherein the highly detailed image is a photographic image or a detailed design drawing, and an image which is not the highly detailed image is an image formed of character strings.

4. An image forming method comprising:

reading image data of red, image data of green and image data of blue by scanning an original image from an original;

selecting image forming with respect to an original of low image quality;

expanding the image data of at least one of red, green and blue of the original image read from the original in bitmap data of one page of the original through prescanning by the reading step;

distinguishing whether the original image is a highly detailed image or not by an amount of the bitmap data;

determining whether or not an image of sufficient image quality can be formed when an image distinguished by the distinguishing step is compressed by a compression method and a compression rate corresponding to the image quality selected by the selecting step;

guiding, when the determining step determines that the image of sufficient image quality cannot be formed, interrupting forming of the image, guiding an operator and displaying a warning message;

selecting whether or not the forming of the image with a high image quality is continued; and setting an encoding method suitable for a low compression rate when the forming of the image with the high image quality is selected by the second selecting step;

setting an encoding method suitable for a high compression rate, when the distinguishing step distinguishes that the original image is not a highly detailed image and when the second selecting step does not select the forming of the image with the high image quality;

reading the original image through re-scanning by the reading step and converting the image data of red, the image data of green and the image data of blue to image forming data for colors of yellow (Y), magenta (M), cyan (C) and black (BK);

compressing image forming data for the colors supplied from the reading and converting step with the compression rate and the encoding method set by the first setting step or second setting step, and registering the image forming data as compressed image data in a storage portion; and reading the compressed image forming data registered by the compressing and registering step in the storage portion and forming an image in an image-formed medium by the image forming data expanded based on the compression rate and the encoding method set by the first setting step or second setting step.

5. The method according to claim 4, wherein the compressing and expanding are performed by a common circuit.

6. The method according to claim 4, wherein the highly detailed image is a photographic image or a detailed design drawing, and an image which is not the highly detailed image is an image formed of character strings.

* * * * *